Patented Jan. 5, 1932

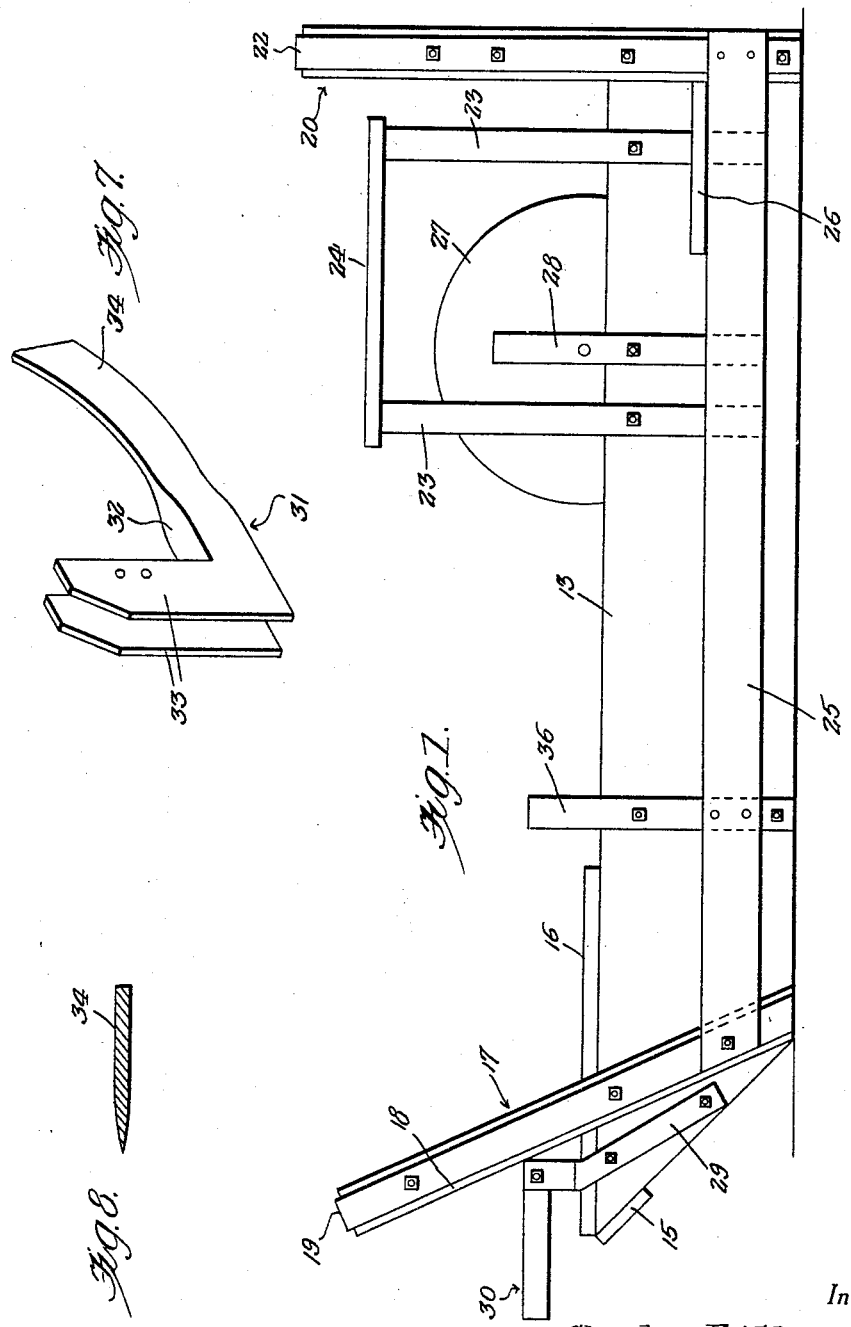

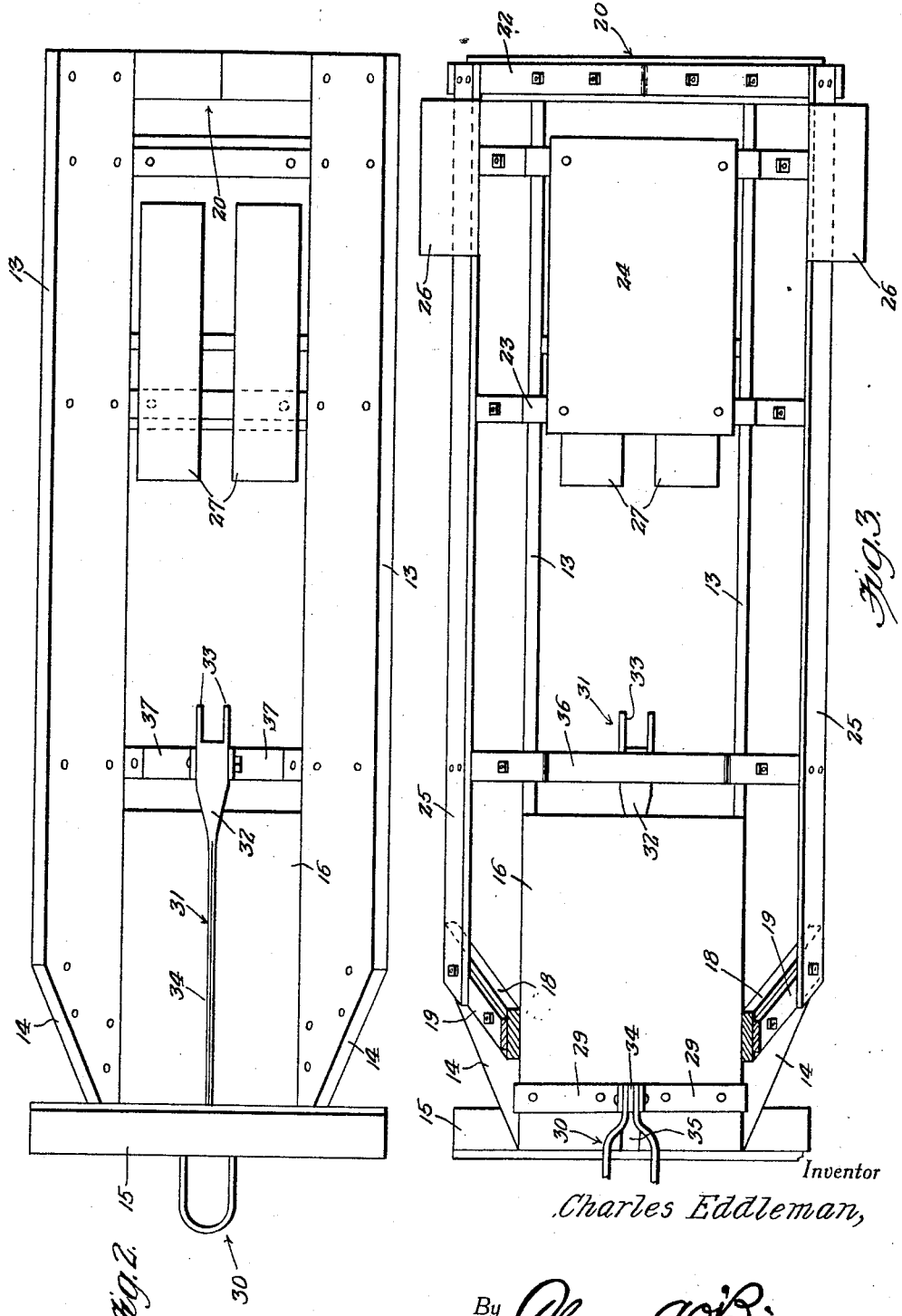

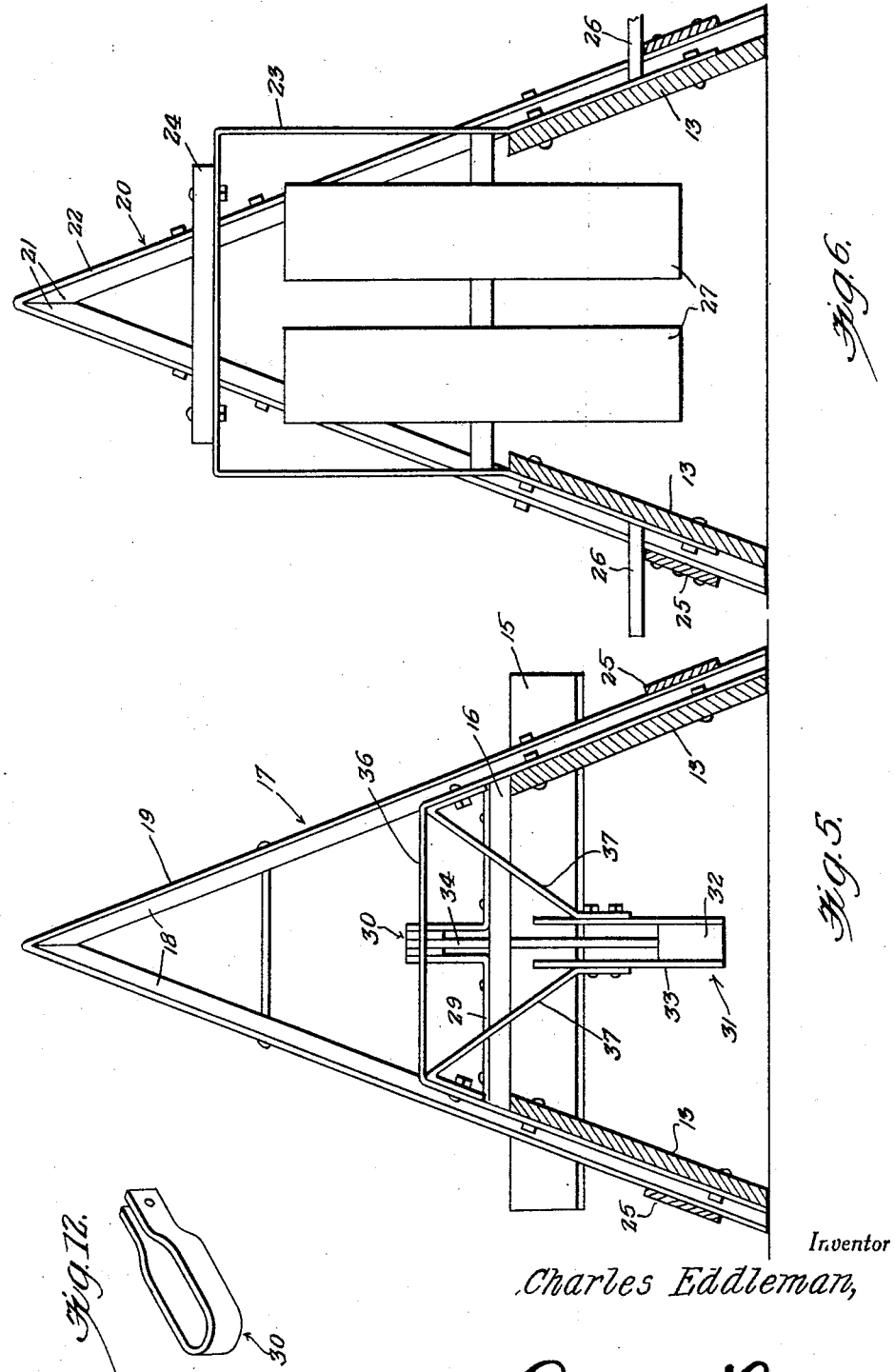

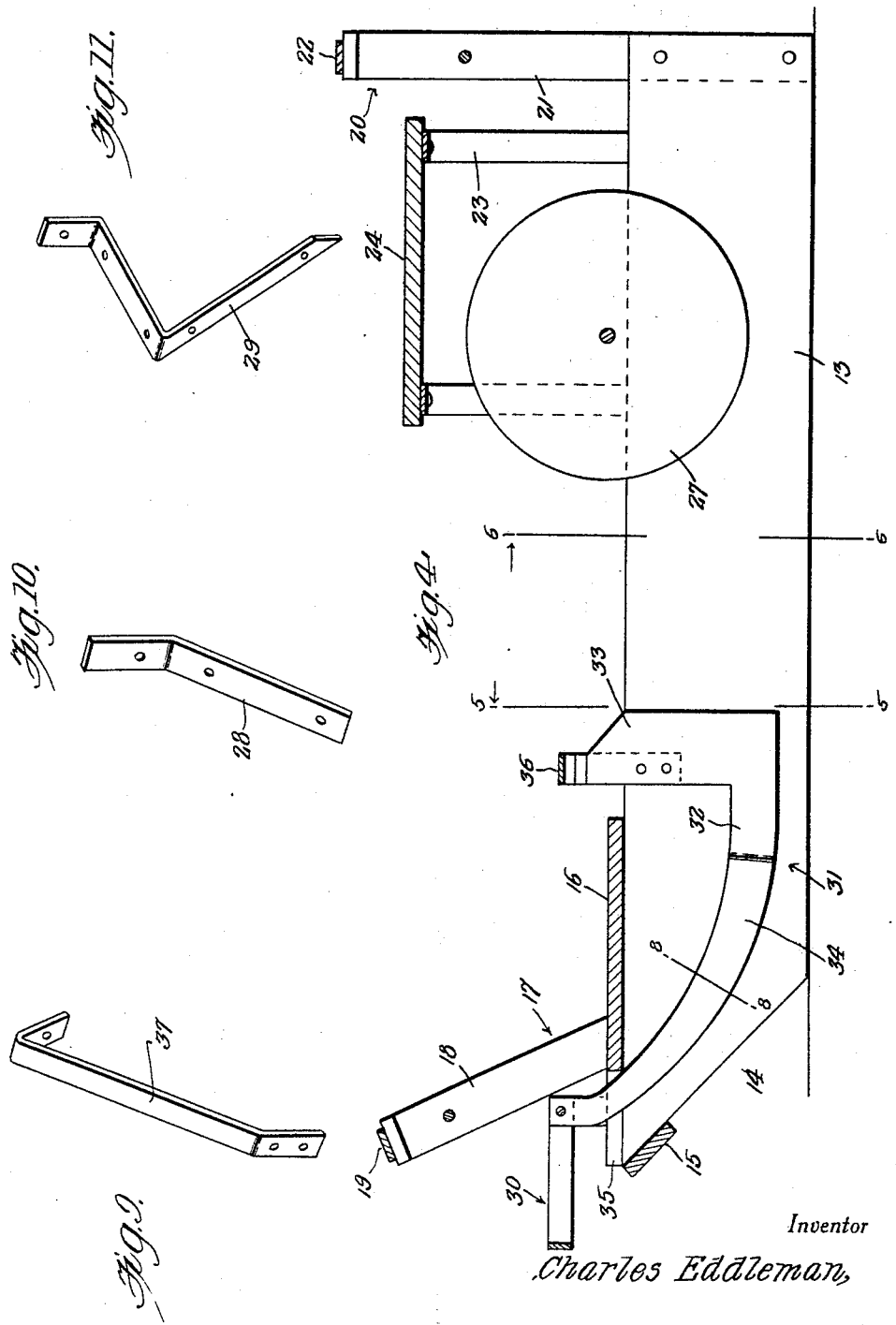

1,839,957

UNITED STATES PATENT OFFICE

CHARLES EDDLEMAN, OF ANNA, ILLINOIS

POTATO PLANTING MACHINE

Application filed March 25, 1930. Serial No. 438,795.

This invention relates to an improved agricultural machine which is especially, but not necessarily adapted for setting and planting sweet potato plants on the crown or crest portion of a mound or ridge.

Briefly stated, the improved machine comprises a sled which is adapted to be drawn along the ridge by suitable draft means. This sled includes spaced runners which straddle the ridge. The sled is provided with appropriate appurtenances and devices to facilitate distribution, setting and planting of the small sweet potato plants.

In carrying the invention into practice, I have evolved and produced a suitable sled which is adapted to accommodate the driver and an attendant, suitable means being provided for aiding in efficient placement of the small slips there also being a comfortably arranged seat board for the attendant and beneath the seat board, a pair of compressing and packing rollers for appropriately conditioning the soil around the plants as they are set in the crown portion of the ridge.

Other features and advantages will become more readily apparent from the following description and drawings.

In the drawings:

Figure 1 is a side elevational view of the complete planting device as constructed in accordance with the present invention.

Figure 2 is a bottom plan view thereof.

Figure 3 is a top plan view of the same.

Figure 4 is a central longitudinal sectional view.

Figures 5 and 6 are transverse vertical sections on the line 5—5 and 6—6 respectively of Figure 4.

Figure 7 is a fragmentary perspective view of the shoe end of the ridge slicer.

Figure 8 is a detail section taken approximately on the plane of the line 8—8 of Figure 4.

Figures 9, 10, 11 and 12 are perspective views of certain of the details.

The portable sled is some six feet in length and of suitable proportions and materials. The spaced parallel sideboard or runners 13 have their front ends bevelled upwardly as at 14 and at this point is a cross piece 15 which serves to connect these end portions together. This front end arrangement facilitates travel over the rough ground. At the front end is a horizontal platform 16 which is adapted to accommodate a box, basket, bucket or the like containing the small plants.

There is a forwardly inclined upright 17 at the front of general V-shaped configuration and the companion members 18 of this are bolted together and serve to accommodate an embracing and reinforcing metal strap device 19. The rear upright 20 is somewhat the same in construction and includes complemental parts 21 which serve to accommodate the protecting and bracing metal strap 22.

The numerals 23 designate a pair of substantially U-shaped or arched supports to the central portions of which a seat board 24 is connected. This seat board is adapted to accommodate the attendants who distribute the plants in an obvious manner. The numerals 25 along the outer sides of the runners represent rails which serve to render the structure rigid, which function as depth guards to some extent and which serve primarily as footrests for the attendant occupying seat 24.

The numerals 26 designate outstanding steps on which the driver stands. The driver stands here when horses are used as the draft means. Just in front of the step 26 and underneath of the seat board are a pair of complemental ground packing rollers 27 which are mounted on the standards 28 carried by the runners.

At the front of the structure I provide a pair of peculiarly shaped attaching brackets 29 whose upper end portions are bolted together to accommodate a draft connecting clevis or coupling loop 30.

In Figure 4, the reference numeral 31 designates generally a specially designed attachment which includes an enlarged portion 32 which functions as a shoe, this being spaced a suitable distance above the crest of the ridge (not shown). Associated with this shoe is a vertical chute and guide device which comprises a pair of spaced parallel flanges 33. Extending forwardly from the shoe 32 is a longitudinally bowed cutting blade or shank 34 whose upper end extends through a notch 35 in the front edge of the platform 16 where it is secured to the pivot bolt between the upper ends of the aforesaid bracket 29 as shown. The numeral 36 designates another metal arch which as shown in Figure 5 serves to accommodate a pair of especially shaped braces 37 of the configuration shown in Figure 5 as well as in Figure 9.

The upper downwardly bent ends are fastened to the metal arch 36 and the lower ends are fastened to opposite sides of the device 31.

In operation, a basket or receptacle containing the slips or plants is placed on the front platform 16. The planter or attendant occupies the seat 24 and places his feet on the rails 25 in an obvious manner. This puts him in a position to reach into the basket and to take the plants out as desired. The plants are dropped one by one down into the chute formed by the flanges 33.

These plants drop into the groove which is sliced into the crest of the ridge by the advancing knife blades 34. The shoe 32 glides along the ridge. Then the rollers 27 come along and serve to pack the soil around the small plants sufficiently tight to hold the small plants in place to take root. As before stated, when the device is horse drawn, the driver straddles the seat 24 and stands on the supporting step 26. Thus as the device is drawn along the ground in the manner of a sled, the plants may be expeditiously placed and properly conditioned and packed. This facilitates planting of sweet potato slips and the like.

From the foregoing description and drawings, it will be seen that I have evolved and produced a simple and economical sled having suitable appliances and devices thereon to faciiltate operation and to expedite service in placing transplanted slips in a mound or ridge in the field.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

1. Means for planting plants in ridges comprising a sled having a pair of upwardly convergingly arranged runners and means for connecting the runners together, a pair of spaced rollers supported at the rear of the sled and located above the lower edges of the runners, a furrow opener supported between the runners at the front end of the sled, said opener having its rear part of forked construction and upwardly extending parts connected to the rear end of each prong of the fork for forming a chute thru which the plants are dropped, said opener being arranged above the lower edges of the runners.

2. Means for planting plants in ridges comprising a pair of runners spaced apart and each runner sloping upwardly and inwardly, upright V-shaped frames having their lower parts connected with the outer faces of the runners, a longitudinally extending beam at the outer side of each runner and connected with the lower portions of said frames, a furrow opener located between the front portions of the runners and located above the lower edges thereof, a draft member connected with the front ends of the runners and with said furrow opener, the rear end of said furrow opener being of forked construction and having upwardly extending portions at the ends of the prongs thereof, a brace frame connected with the runners and with portions of said upwardly extending parts, said upwardly extending parts forming a chute for receiving the plants, uprights connected with the rear part of the sled and supporting a chute, and a pair of spaced rollers supported from the sled and located under the chute, said rollers being arranged above the lower edges of the runners.

In testimony whereof I affix my signature.

CHARLES EDDLEMAN.